United States Patent [19]

Teppo

[11] 4,025,194

[45] May 24, 1977

[54] COMMON APERTURE LASER TRANSMITTER/RECEIVER

[75] Inventor: Edward A. Teppo, Ridgecrest, Calif.

[73] Assignee: The United States of America as represented by the Secretary of the Navy, Washington, D.C.

[22] Filed: Mar. 22, 1976

[21] Appl. No.: 669,051

[52] U.S. Cl. .................................. 356/5; 250/199; 332/7.51; 356/4.28; 331/DIG. 1
[51] Int. Cl.² ..................... G01C 3/08; H01S 3/00
[58] Field of Search ............ 356/4, 5, 28; 332/7.51; 250/199; 331/94.5 A

[56] References Cited

OTHER PUBLICATIONS

E. A. Teppo; *Nd:YAG Laser Lab Experiments*; 8-1973; TN 4051-7; pp. 71, 72.

*Primary Examiner*—S.C. Buczinski
*Attorney, Agent, or Firm*—R. S. Sciascia; Roy Miller

[57] ABSTRACT

A common-optics laser transceiver has a common aperture for transmitting and receiving a laser beam, and uses the resonator polarizer to separate the resonator beam from the receiver beam, resulting in a polarization sensitive, lightweight laser transmitter/receiver.

6 Claims, 1 Drawing Figure

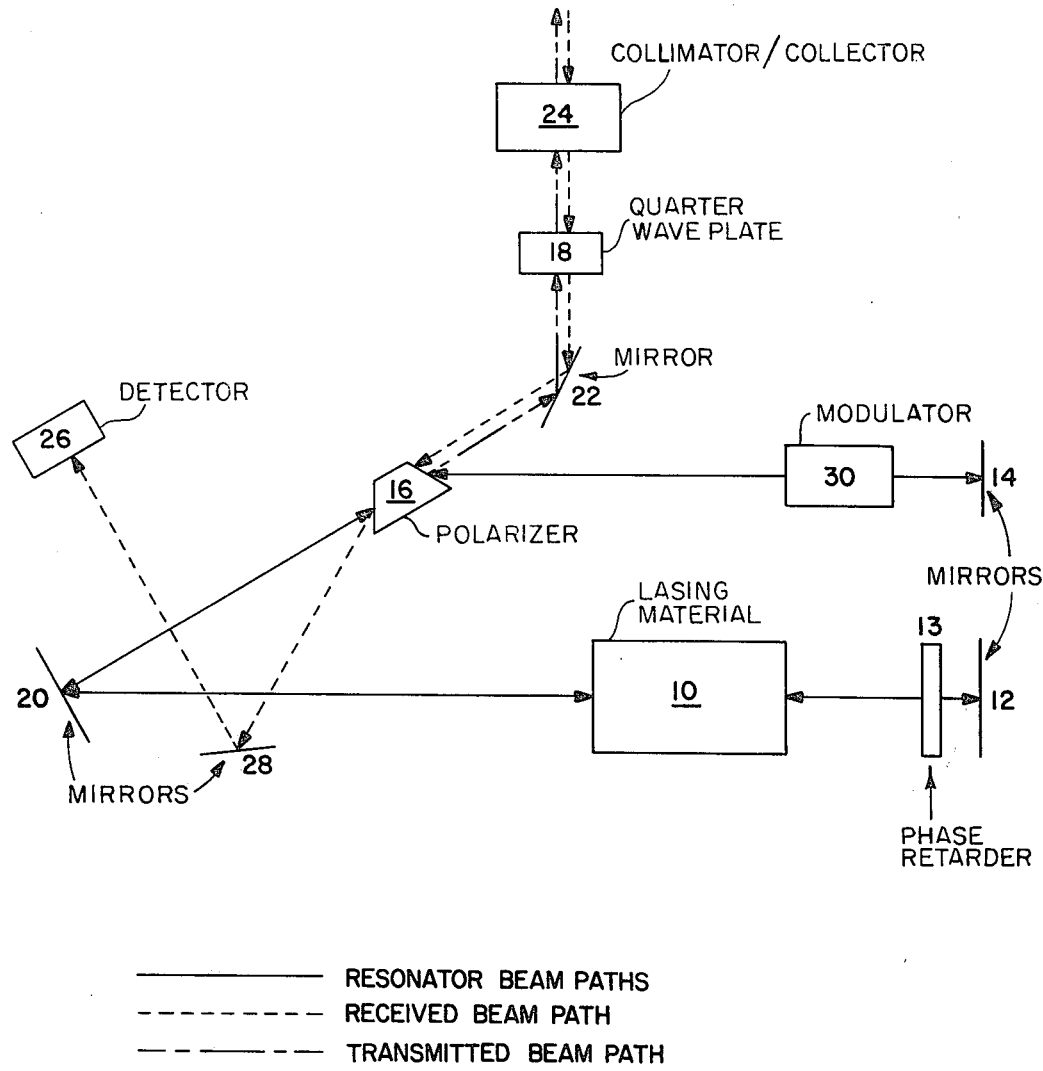

COMMON APERTURE LASER TRANSMITTER/RECEIVER

BACKGROUND OF THE INVENTION

The present invention relates to laser transmitters and receivers, and more particularly to a laser transceiver which uses a polarization discrimination technique such that optics used for the transmitter section are common to the receiver section.

If the intended use of a laser resonator includes a rangefinder, for example, a second aperture to that of the transmitting aperture, and usually a separate module, is usually needed, resulting in a significant increase in the weight, volume and complexity of the unit, with boresight adjustments also being required. The use of a common aperture for both transmission and reception of optical radiation, although not as sensitive as a separate identical aperture area for receiver, will result in appreciable savings in weight, volume and complexity.

SUMMARY

Accordingly, the present invention provides a resonant laser cavity which produces a linearly polarized resonator beam. The resonator beam is subjected to a phase retardation so that when it passes through a resonator prism, part of the beam will produce an output beam which is circularly polarized after passage through a quarter wave plate. The optic axis of the quarter wave plate is oriented at 45° to the incident output beam plane of polarization. The return radiation encounters the quarter wave plate which alters the return radiation such that when it passes through the resonator prism it will travel to a detector rather than along the path of the resonator beam.

BRIEF DESCRIPTION OF THE DRAWING

The FIGURE is a plane view of an embodiment of a common-optics laser transceiver.

DESCRIPTION OF A PREFERRED EMBODIMENT

Referring now to the FIGURE, a cell of lasing material 10, excited by any means common to the art such as flash lamps, another laser, etc., produces a resonant laser beam which is linearly polarized. The resonator beam is reflected by end mirrors 12 and 14, such as porro prism end reflectors, which define the resonant laser cavity. The resonator beam is subjected to phase retardation near the end mirror 12 by a phase retarder 13. A resonator polarizer 16, such as a thin film polarizer or a prism, situated between lasing cell 10 and the end mirror 14, separates the resonator beam into two components, an output component and a resonant component. The resonant component of the beam is directed toward end mirror 14 where it is reflected to maintain the resonant laser action of the cavity. The output component of the resonator beam passes through a quarter wave plate 18 whose optic axis is oriented at 45° to the plane of polarization of the output component to change the linearly polarized resonator output beam to a circularly polarized output beam. In the particular embodiment described herein, a resonator fold mirror 20, situated between the lasing cell 10 and the resonator polarizer 16, is used to fold the resonator beam back in order to reduce the actual physical size of the cavity. Also in this embodiment, an exit mirror 22 deflects the output component of the resonator beam to the aperture of the laser transceiver.

Collimator/collecting optics 24 are situated at the aperture after the quarter wave plate 18 to determine the final aperture size. Some of the optical energy reflected by a target returns to the laser tranceiver along the same path as that taken by the output component of the resonator beam. The received beam has a component of its electric field reversed by 180° as a result of the reflection from the target. When the received beam passes through the quarter wave plate 18, it is linearly polarized in such a manner that its plane of polarization is rotated 90° with respect to the resonator output beam. Therefore, when the received beam passes through the resonator polarizer 16, it will take a path different from that of the resonator beam. An optical detector 26 is located in the path of the received beam to detect and, with its associated electronics, to process the received beam. In order to optimize the detection capabilities of the optical detector 26, a focusing mirror 28 is used to focus the received beam onto the optical detector.

The amount of phase retardation of the resonator beam required is a function of the lasing material of the cell 10, and is adjusted to provide just enough of the resonator beam to efficiently sustain resonance in the laser cavity and, thus, optimize the output component of the resonator beam.

If the received beam has been depolarized as a result of reflection from a target of high reflectivity, a portion, but not all, of the received beam will still be directed to the optical detector 26 by the resonator polarizer 16. If a pulsed or Q-switched laser is used, usable information will still be obtainedd from the received beam. Q-switched operation is achieved by appropriate time synchronized voltage control, i.e., Q-factor control, of the resonator using a Q-switch moculator 30. Optical filters and apertures are used as necesary to reduce background and extraneous optical radiation to an acceptable level.

Therefore, it is apparent that the present invention results in a light weight, compact and simple laser transceiver which is polarization sensitive. Obviously, many modifications and variations of the present invention are possible in light of the teachings It is, therefore to be understood that, within the scope of the appended claims, the invention may be practiced otherwise than as specifically described.

What is claimed is:
1. A common-optics laser transceiver comprising:
 a resonant laser cavity having a cell of lasing material which provides a linearly polarized beam when excited, and two reflective end mirrors situated one on either side of said lasing cell along the optical axis;
 means for providing phase retardation of said beam, said retardation means being situated along the optical axis between said lasing cell and the first of said end mirrors;
 means for polarizing said beam to provide a transmitted beam and a resonator beam, said polarizing means being situated along the optical axis between said lasing cell and the second of said end mirrors so that said resonator beam is directed to said second end mirror, the amplitude of said resonator beam being a function of the amount of phase retardation, and being sufficient to maintain resonance in said laser cavity;

means for circularly polarizing said transmitted beam, said polarizing means being situated along the optical axis of said transmitted beam; and means for detecting a received beam, said received beam being that portion of said transmitted beam reflected from a target, the path of said received beam being coincident with the path of said transmitted beam through the circularly polarizing means to said polarizing means where said received beam is directed to said detecting means.

2. A common-optics laser transceiver as recited in claim 1 further comprising means for focusing said received beam onto said detecting means after said received beam has passed through said polarizing means.

3. A common-optics laser transceiver as recited in claim 2 further comprising means for collimating said transmitted beam and collecting said received beam, said collimating and collecting means being situated after said circularly polarizing means along the optical axis of said transmitted and received beams, whereby the common aperture of said laser cavity is determined.

4. A common-optics laser transceiver as recited in claim 3 wherein said circularly polarizing means comprises a quarter wave plate whose optic axis is oriented at 45° to the plane of polarization of said transmitted beam.

5. A common-optics laser transceiver as recited in claim 4 further comprising a fold mirror situated between said lasing cell and said polarizing means so that said beam is reflected at an acute angle between said polarizing means and said lasing cell, whereby the physical size of said laser cavity is reduced.

6. A common-optics laser transceiver as recited in claim 5 further comprising an exit mirror situated in relation to said polarizing means so that said transmitted beam is deflected to said circularly polarizing means.

* * * * *